(12) United States Patent
Hsu

(10) Patent No.: US 11,249,566 B2
(45) Date of Patent: Feb. 15, 2022

(54) POINTER DEVICE

(71) Applicant: Shenzhen Pu Ying Innovation Technology Corp., LTD., Shenzhen (CN)

(72) Inventor: Chung-Wen Hsu, Shenzhen (CN)

(73) Assignee: Shenzhen Pu Ying Innovation Technology Corp., LTD., Shenzhen (CN)

(*) Notice: Subject to any disclaimer, the term of this patent is extended or adjusted under 35 U.S.C. 154(b) by 14 days.

(21) Appl. No.: 17/065,867

(22) Filed: Oct. 8, 2020

(65) Prior Publication Data

US 2021/0342022 A1 Nov. 4, 2021

(30) Foreign Application Priority Data

Apr. 30, 2020 (CN) .......................... 202010366081.2

(51) Int. Cl.
  *G06F 3/0354* (2013.01)
  *G06F 3/041* (2006.01)
(52) U.S. Cl.
  CPC ...... *G06F 3/03545* (2013.01); *G06F 3/04146* (2019.05); *G06F 3/04162* (2019.05)
(58) Field of Classification Search
  CPC ............. G06F 3/03545; G06F 3/04146; G06F 3/04162; G06F 3/03543; G06F 3/0354
  See application file for complete search history.

(56) References Cited

U.S. PATENT DOCUMENTS

| 2005/0043918 | A1* | 2/2005 | Katsurahira | .......... | G06F 1/3237 |
| | | | | | 702/178 |
| 2017/0131798 | A1 | 5/2017 | Geaghan et al. | | |
| 2019/0250726 | A1* | 8/2019 | Yamada | ................ | H01F 27/004 |

FOREIGN PATENT DOCUMENTS

| CN | 1573671 A | 2/2005 |
| CN | 105700716 A | 6/2016 |
| CN | 109564479 A | 4/2019 |

* cited by examiner

*Primary Examiner* — Temesghen Ghebretinsae
*Assistant Examiner* — Ivelisse Martinez Quiles

(57) ABSTRACT

A pointer device is provided. The pointer device includes an induction coil, a clock generating circuit, and a control circuit. The induction coil converts magnetic energy into electrical potential energy and stores the electrical potential energy in a power storage period, and receives an instruction signal from the electromagnetic coordinate positioning apparatus in an instruction receiving period. The control circuit decodes the instruction signal in the instruction receiving period according to the clock signal after the power storage period. When determining that the instruction signal is one of a plurality of predefined instructions, the control circuit triggers, in a data transmission period, the induction coil to send a data signal corresponding to the instruction signal to the electromagnetic coordinate positioning apparatus according to the clock signal after the instruction receiving period. The instruction signal and the data signal each include a fixed quantity of bits.

10 Claims, 5 Drawing Sheets

POINTER DEVICE

CROSS-REFERENCE TO RELATED APPLICATION

This non-provisional application claims priority under 35 U.S.C. § 119(a) to Patent Application No. 202010366081.2 filed in China, P.R.C. on Apr. 30, 2020, the entire contents of which are hereby incorporated by reference.

BACKGROUND

Technical Field

An embodiment of the present invention relates to a pointer device, and in particular, to a pointer device for an electromagnetic coordinate positioning apparatus.

Related Art

For conventional pointer devices, an electromagnetic coordinate positioning apparatus sends instructions of non-fixed durations to a pointer device. The process of decoding instructions of non-fixed durations is rather complex. The pointer device reports data of non-fixed durations to the electromagnetic coordinate positioning apparatus. In other words, the time for which the pointer device needs to operate varies with different instructions sent by the electromagnetic coordinate positioning apparatus. As a result, the pointer device and the electromagnetic coordinate positioning apparatus cannot operate synchronously. In addition, the pointer device is difficult to implement, its circuit needs to be implemented using complex circuit elements, and high power consumption is required.

Moreover, conventional pointer devices generally adopt a resistor-capacitor charging and discharging technique to calculate and digitize pressure data with a fixed-frequency clock and transmit same to the electromagnetic coordinate positioning apparatus. When we want to analyze the pressure data at higher pressure levels, the speed of calculating and digitizing the pressure data by using the charging and discharging technique in combination with a fixed-frequency clock is low, and it takes a long time for the pointer device to report the pressure data, leading to a low report rate.

SUMMARY

In an embodiment, provided is a pointer device, including an induction coil, a clock generating circuit, and a control circuit. The induction coil is configured to convert magnetic energy of an excitation magnetic field formed by the electromagnetic coordinate positioning apparatus into electrical potential energy and stores the electrical potential energy in a power storage period, and receive an instruction signal from the electromagnetic coordinate positioning apparatus in an instruction receiving period, the instruction signal including a fixed quantity of bits. Owing to the energy conversion and storage mechanism, the clock generating circuit starts operation and generates a clock signal. The control circuit is configured to: decode the instruction signal in the instruction receiving period according to the clock signal after the power storage period to determine whether the instruction signal is one of a plurality of predefined instructions, wherein when the instruction signal is one of the plurality of predefined instructions, the control circuit triggers, in a data transmission period, the induction coil to send a data signal corresponding to the instruction signal to the electromagnetic coordinate positioning apparatus according to the clock signal after the instruction receiving period, the data signal including a fixed quantity of bits, and the induction coil respectively sends the bits of the data signal at different timing in the data transmission period, to respond to the instruction signal. The power storage period, the instruction receiving period, and the data transmission period, there are fixed and predefined time durations for each period.

DETAILED DESCRIPTION

Figure 1:
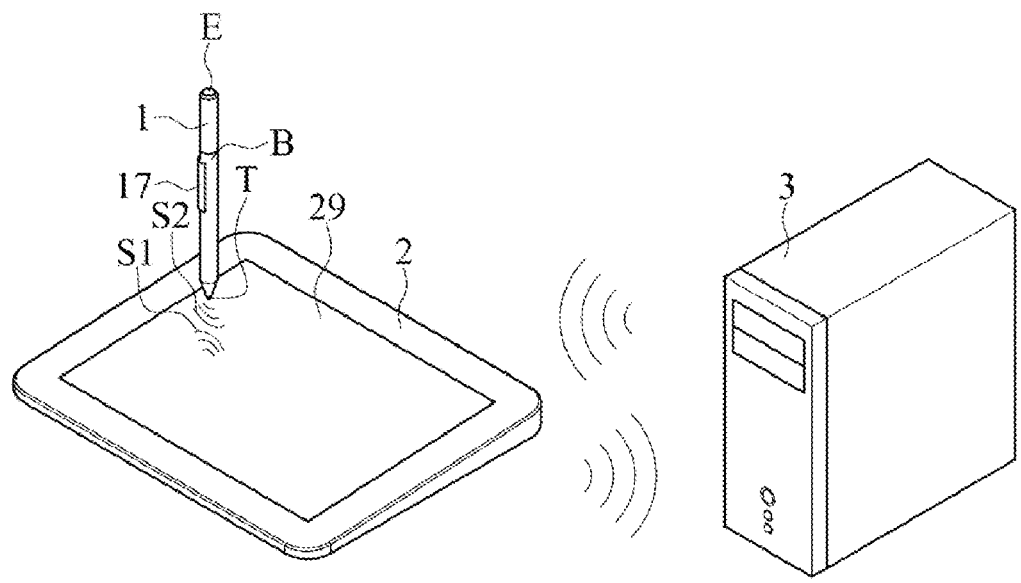
FIG. 1 is a diagram of an embodiment of a pointer device.
Figure 2:
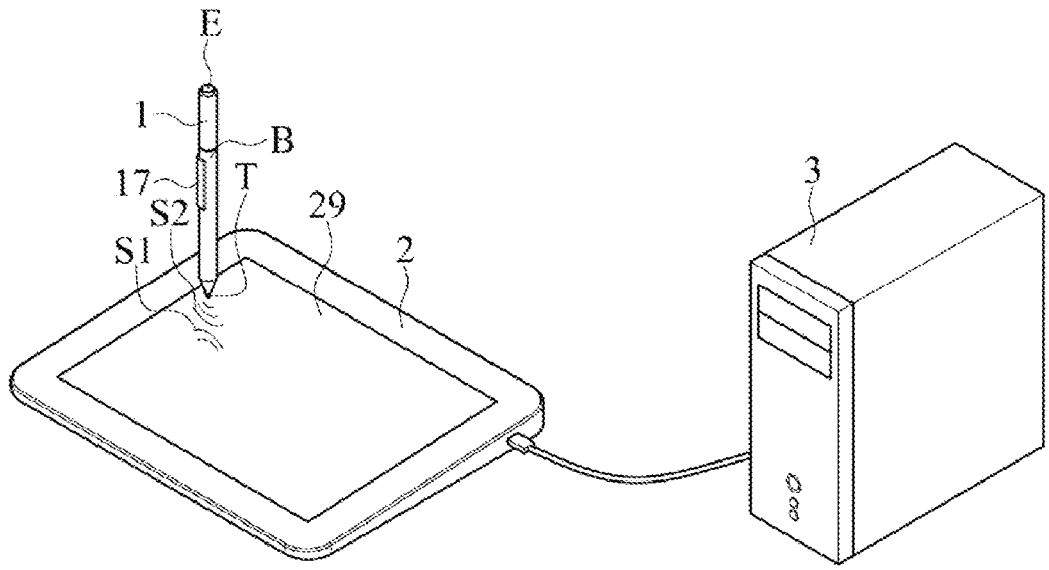
FIG. 2 is a diagram of an embodiment of an electromagnetic coordinate positioning apparatus applicable to FIG. 1.

FIG. 1 and FIG. 2 are respectively diagrams of an embodiment of a pointer device 1 and an embodiment of an electromagnetic coordinate positioning apparatus 2 applicable to the pointer device 1. Referring to FIG. 1 and FIG. 2, the electromagnetic coordinate positioning apparatus 2 includes a working area 29. The pointer device 1 may or may not contact with the working area 29 of the electromagnetic coordinate positioning apparatus 2. When the pointer device 1 is close to the working area 29, the electromagnetic coordinate positioning apparatus 2 may sense an induction signal of the pointer device 1 and receive a signal sent by the pointer device 1. When the pointer device 1 is pressed on the working area of the electromagnetic coordinate positioning apparatus 2, the electromagnetic coordinate positioning apparatus 2 may further receive a pressure signal from the pointer device 1. In addition, as shown in FIG. 1 and FIG. 2, the electromagnetic coordinate positioning apparatus 2 may communicate with another electronic device 3 in a wired or wireless manner. In an embodiment, the electromagnetic coordinate positioning apparatus 2 may be a writing tablet, a mobile phone, a tablet computer, a notebook computer, a digital tablet, or a smart notebook. The pointer device 1 may be an electromagnetic induction type stylus, mouse, or a puck. The electronic device 3 may be a mobile phone, a tablet computer, or a notebook computer.

Figure 3:
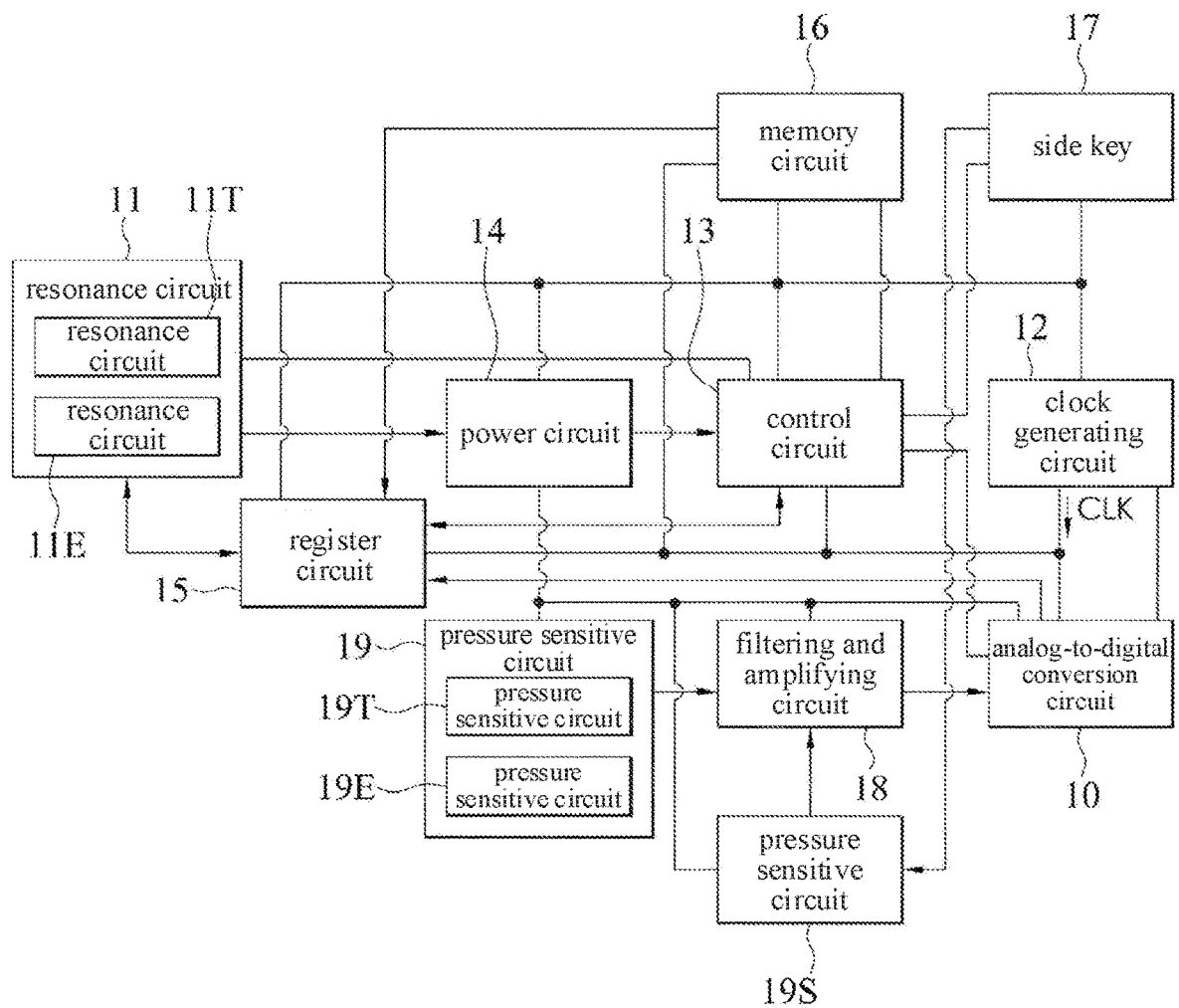
FIG. 3 is a circuit block diagram of an embodiment of a pointer device.
Figure 4:
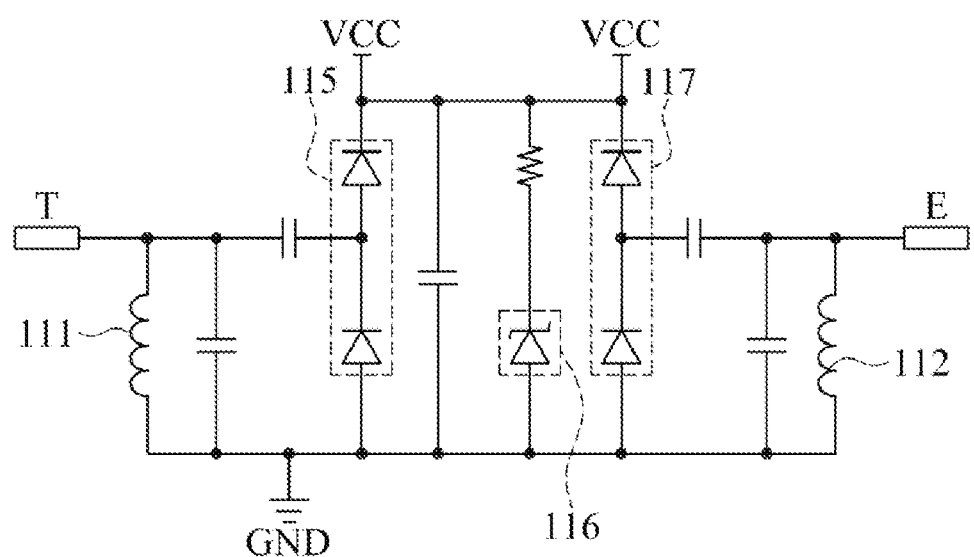
FIG. 4 is a circuit diagram of an embodiment of a resonance circuit and a power circuit of FIG. 3.
Figure 5:
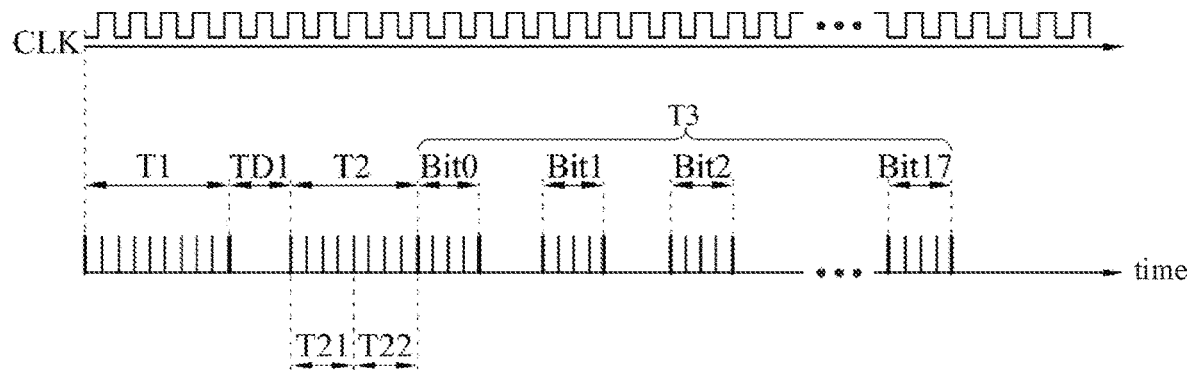
FIG. 5 is a timing diagram of a first embodiment of operation of a pointer device.
Figure 6:
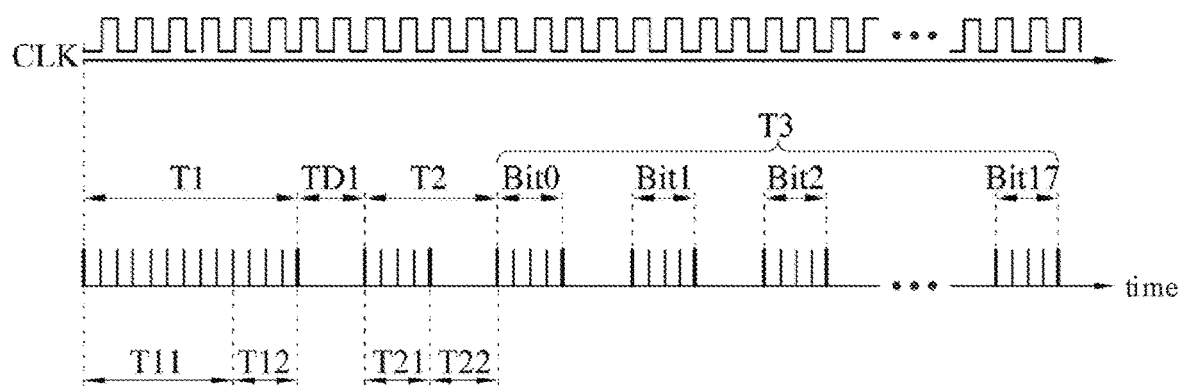
FIG. 6 is a timing diagram of a second embodiment of operation of a pointer device.
Figure 7:
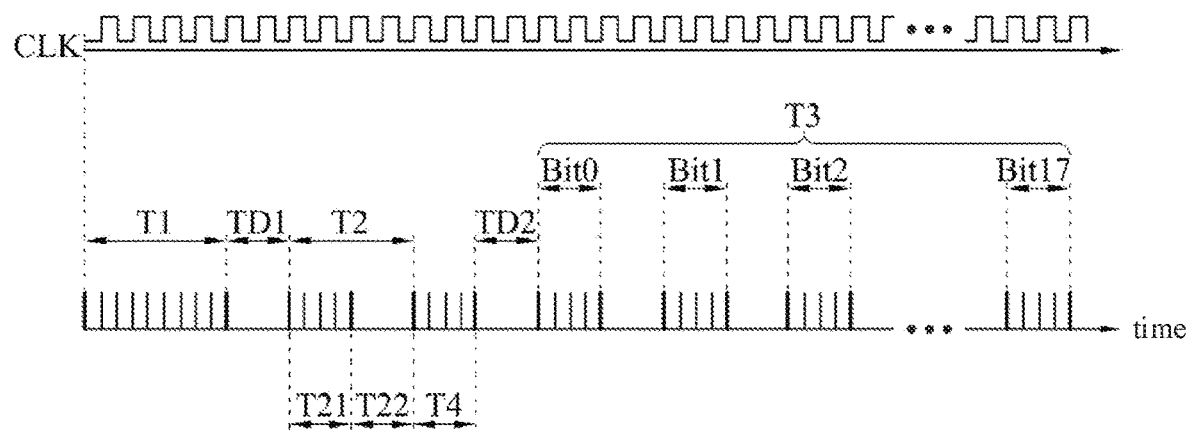
FIG. 7 is a timing diagram of a third embodiment of operation of a pointer device.

FIG. 3 is a circuit block diagram of an embodiment of the pointer device 1. FIG. 4 is a circuit diagram of an embodiment of a resonance circuit 11 and a power circuit 14 of FIG. 3. Referring to FIG. 3 and FIG. 4, the pointer device 1 includes a resonance circuit 11, a clock generating circuit 12, and a control circuit 13. The resonance circuit 11 includes an induction coil 111. The pointer device 1 is close to the electromagnetic coordinate positioning apparatus 2, as shown in FIG. 5, FIG. 6 and FIG. 7, operating timing of the pointer device 1 includes a power storage period T1, an instruction receiving period T2, and a data transmission period T3, and the power storage period T1, the instruction receiving period T2, and the data transmission period T3, there are fixed and predefined durations for each period. The pointer device 1 is electromagnetically coupled to an excitation magnetic field of the electromagnetic coordinate positioning apparatus 2 in the power storage period T1, and converts the magnetic energy into electrical potential energy for operation of the pointer device 1. During operation, the pointer device 1 may receive an instruction signal S1 from the electromagnetic coordinate positioning apparatus in the instruction receiving period T2, and sends a data signal S2 to the electromagnetic coordinate positioning apparatus 2 in the data transmission period T3, to respond to the instruction signal S1. In other words, the pointer device 1 can communicate with the electromagnetic coordinate positioning apparatus 2.

In particular, in an electromagnetic coupling cycle T11 of the power storage period T1, the electromagnetic coordinate positioning apparatus 2 generates an excitation current to form an excitation magnetic field of a specific and predefined frequency, the resonance circuit 11 was coupled by the said time-varying magnetic field of the specific and predefined frequency, which is converted by the induction coil 111 and capacitors in the resonance circuit 11 into a time-varying electric field of the specific and predefined frequency, which is then converted by a capacitor and a diode circuit in the resonance circuit 11 into a DC electrical potential energy to be stored in a capacitor or capacitors. The stored electrical potential energy can supply power required for operation of various circuit elements of the pointer device 1 such as the clock generating circuit 12 and the control circuit 13. After the power storage period T1, as shown in FIG. 5, FIG. 6 and FIG. 7, the pointer device 1 is in the instruction receiving period T2, the induction coil 111 receives the instruction signal S1 from the electromagnetic coordinate positioning apparatus in the instruction receiving period T2, and the instruction signal S1 has a fixed quantity of bits, for example, 20 bits.

On the other hand, the clock generating circuit 12 operates and generates a clock signal CLK. The clock signal CLK serves as a clock signal for collaborative operation of the pointer device 1 and the electromagnetic coordinate positioning apparatus 2. The frequency of the clock signal CLK may be 450 KHz, 500 KHz, 750 KHz, or 1 MHz. Because the power storage period T1 is a fixed and predefined time duration, the control circuit 13 may detect by the clock signal CLK that the pointer device 1 is already in the instruction receiving period T2. The control circuit 13 decodes the instruction signal S1 in the instruction receiving period T2, and the control circuit 13 determines whether the instruction signal S1 is one of a plurality of predefined instructions. For example, the quantity of predefined instructions may be four, and the control circuit 13 may determine that the instruction signal S1 is the first predefined instruction, the second predefined instruction, the third predefined instruction, or the fourth predefined instruction.

After determining that the instruction signal S1 is one of the predefined instructions, the control circuit 13 selects a corresponding data signal S2 according to the instruction signal S1. The data signal S2 is a fixed bit length data. After the instruction receiving period T2, the control circuit 13 may detect by the clock signal CLK that the pointer device 1 is already in the data transmission period T3. In the data transmission period T3, the control circuit 13 triggers the induction coil 111 to send the data signal S2 corresponding to the instruction signal S1 to the electromagnetic coordinate positioning apparatus 2, to respond to the instruction signal S1 sent by the electromagnetic coordinate positioning apparatus 2. In the data transmission period T3, the induction coil 111 sequentially sends the bits of the data signal S2 to the electromagnetic coordinate positioning apparatus 2, where the sending time is fixed for each bit.

For example, it is assumed that the first predefined instruction, the second predefined instruction, the third predefined instruction, and the fourth predefined instruction are respectively corresponding to a first data signal, a second data signal, a third data signal, and a fourth data signal, and the data signal S2 includes 18 bits, that is, the first data signal, the second data signal, the third data signal, and the fourth data signal each include 18 bits. If the control circuit 13 determines that the instruction signal S1 is the third predefined instruction, the control circuit 13 selects the third data signal as the data signal S2 corresponding to the instruction signal S1. As shown in FIG. 5 to FIG. 7, the control circuit 13 triggers the induction coil 111 to sequentially send 18 bits (Bit 0 to Bit 17) of the third data signal to the electromagnetic coordinate positioning apparatus 2 in fixed transmission intervals in the data transmission period T3. The rest can be deduced by analogy, so the details will not be described herein. Thus, one communication process between the pointer device 1 and the electromagnetic coordinate positioning apparatus 2 is completed. Then, the pointer device 1 may repeatedly perform the foregoing power storage process, instruction receiving process and data transmission process, that is, perform another communication process with the electromagnetic coordinate positioning apparatus 2 to respond to another instruction signal sent by the electromagnetic coordinate positioning apparatus 2. In an embodiment, the control circuit 13 may be implemented by an application-specific integrated circuit (ASIC).

Based on this, the length of the instruction signal S1 is fixed, and the process of decoding the instruction signal S1 by the control circuit 13 is relatively simple. Compared with the operating frequency of the electromagnetic coordinate positioning apparatus 2, the pointer device 1 can operate at a lower operating frequency. For example, the operating frequency of the pointer device 1 may be half of the operating frequency of the electromagnetic coordinate positioning apparatus 2. Furthermore, the power storage period T1, the instruction receiving period T2, and the data transmission period T3 are all fixed, and the length of the data signal S2 is also fixed. The circuit elements of the pointer device 1 can operate synchronously with the electromagnetic coordinate positioning apparatus 2 according to the clock signal CLK. The circuit elements of the pointer device 1 may be implemented by an application-specific integrated circuit of a digital logic circuit, which has a simple circuit architecture and requires low power consumption.

In an embodiment, according to different modulation techniques, the resonance circuit 11 may send the data signal S2 to the electromagnetic coordinate positioning apparatus 2 by Frequency Shift Keying (FSK), Phase Shift Keying (PSK) or Amplitude Shift Keying (ASK) . . . and so on. Furthermore, as shown in FIG. 3, the pointer device 1 further includes a power circuit 14. The power circuit 14 is coupled to the circuit elements of the pointer device 1, such as the resonance circuit 11, the clock generating circuit 12, and the control circuit 13. The induction coil 111 converts the magnetic energy into electrical potential energy and stores the electrical potential energy in the power storage period T1, and the power circuit 14 converts the time-varying electric field of a specific and predefined frequency into a DC power supply to provide a stable power supply required for operation of the circuit elements of the pointer device 1.

In an embodiment, before the electromagnetic coordinate positioning apparatus 2 sends the instruction signal S1, the electromagnetic coordinate positioning apparatus 2 further sends a trigger signal. The induction coil 111 receives the trigger signal. According to the clock signal CLK, the control circuit 13 receives the trigger signal at the first rising edge in the instruction receiving period T2. The control circuit 13 further determines, according to the trigger signal, that a signal received after the trigger signal is the instruction signal S1 instead of noise. The control circuit 13 may decode the instruction signal S1 according to the trigger signal to improve the quality of communication between the pointer device 1 and the electromagnetic coordinate positioning apparatus 2.

In an embodiment, the instruction signal S1 includes continuous, uninterrupted excitation signals of the same frequency, and according to different predefined instructions, durations of excitation signals in different instruction signals S1 are different. For example, as shown in the following table, assuming that the first predefined instruction, the second predefined instruction, the third predefined instruction, and the fourth predefined instruction are each a digital signal including 20 bits and "1" represents an excitation signal, the first predefined instruction includes 4 continuous excitation signals of the same frequency, the second predefined instruction includes 8 continuous excitation signals of the same frequency, the third predefined instruction includes 12 continuous excitations of the same frequency, and the fourth predefined instruction includes 16 continuous excitation signals of the same frequency. Based on this, the durations of continuous excitation signals of the same frequency in the four predefined instructions are different, and in the instruction receiving period T2, the control circuit 13 can determine, according to the duration of continuous excitation signals included in the instruction signal S1, that the instruction signal S1 is the first predefined instruction, the second predefined instruction, the third predefined instruction or the fourth predefined instruction, and trigger the induction coil 111 to send the corresponding first data signal, second data signal, third data signal or fourth data signal to the electromagnetic coordinate positioning apparatus 2.

| | |
|---|---|
| First predefined instruction | 20'b1111_0000_0000_0000_0000 |
| Second predefined instruction | 20'b1111_1111_0000_0000_0000 |
| Third predefined instruction | 20'b1111_1111_1111_0000_0000 |
| Fourth predefined instruction | 20'b1111_1111_1111_1111_0000 |

In an embodiment, the plurality of predefined instructions include a pressure value instruction, a manufacturing date instruction, an identification number instruction, and the like. The electromagnetic coordinate positioning apparatus 2 sends the instruction signal S1 to request the pointer device 1 for identification number, manufacturing date, or pressure value that the pointer device 1 applied to the electromagnetic coordinate positioning apparatus 2. The control circuit 13 may determine, according to the duration of continuous excitation signals included in the instruction signal S1, that the instruction signal S1 is the identification number instruction, the manufacturing date instruction, or the pressure value instruction, and trigger the induction coil 111 to correspondingly send a data signal S2 including identification number, manufacturing date or pressure value, that is, the first data signal, the second data signal and the third data signal respectively include identification number, manufacturing date and a pressure value.

In particular, as shown in FIG. 3, the pointer device 1 further includes a memory circuit 16, which may be a programmable read-only memory such as an electrically erasable programmable read-only memory (EEPROM) or a flash memory. The memory circuit 16 is electrically-coupled to the power circuit 14 and the control circuit 13. The memory circuit 16 stores the identification number and the manufacturing date of the pointer device 1. When the control circuit 13 parses that the instruction signal S1 is the identification number instruction, the control circuit 13 controls the memory circuit 16 to output the identification number of the pointer device 1 so that the data signal S2 includes the identification number. As shown in FIG. 5, after the instruction receiving period T2, the induction coil 111 sends the data signal S2 including the identification number to the electromagnetic coordinate positioning apparatus 2 in the data transmission period T3, to respond to the instruction signal S1 which is the identification number report instruction. Alternatively, when the control circuit 13 parses that the instruction signal S1 is the manufacturing date instruction, the control circuit 13 controls the memory circuit 16 to output the manufacturing date of the pointer device 1 so that the data signal S2 includes the manufacturing date, and the induction coil 111 sends the data signal S2 including the manufacturing date to the electromagnetic coordinate positioning apparatus 2, to respond to the instruction signal S1 which is the manufacturing date instruction.

In an embodiment, the memory circuit 16 may further store color data of the pointer device 1. When the control circuit 13 parses that the instruction signal S1 is the identification number instruction, the control circuit 13 controls the memory circuit 16 to output the identification number and the color data of the pointer device 1 so that the data signal S2 includes the identification number and the color data, and the induction coil 111 sends the data signal S2 including the identification number and the color data to the electromagnetic coordinate positioning apparatus 2 in the data transmission period T3. After receiving the color data, the electromagnetic coordinate positioning apparatus 2 may display a corresponding color according to the color data, such as red, green, blue, or black.

In an embodiment, as shown in FIG. 3 and FIG. 4, the pointer device 1 further includes a pressure sensing circuit 19, a filtering and amplifying circuit 18 and an analog-to-digital conversion circuit 10. Structurally, the actuation structure of the pressure sensing circuit 19 may traverse or be arranged in the resonance circuit 11. The pressure sensing circuit 19 is electrically-coupled to the filtering and amplifying circuit 18, the filtering and amplifying circuit 18 is connected to the analog-to-digital conversion circuit 10, and the control circuit 13 is coupled to the analog-to-digital conversion circuit 10 to receive the pressure value. The pressure sensing circuit 19 may be a variable capacitor, a variable resistor or a variable inductor. The pressure sensing circuit 19 may generate an analog pressure signal according to a pressure applied by the pointer device 1 to the electromagnetic coordinate positioning apparatus 2. The filtering and amplifying circuit 18 may filter and amplify the analog pressure signal. The analog-to-digital conversion circuit 10 receives the filtered and amplified analog pressure signal and converts this signal into a numeric value. As shown in FIG. 6, the control circuit 13 controls the analog-to-digital conversion circuit 10 to perform analog-to-digital conversion in an analog-to-digital conversion period T12 in the power storage period T1, to convert the analog pressure signal into a pressure value; or, as shown in FIG. 7, the control circuit 13 may control the analog-to-digital conversion circuit 10 to perform analog-to-digital conversion in an analog-to-digital conversion period T4 between the instruction receiving period T2 and the data transmission period T3 to generate the pressure value.

Based on this, when the control circuit 13 determines in the instruction receiving period T2 that the instruction signal S1 is the pressure data report instruction, the data signal S2 includes the pressure value, and the control circuit 13 triggers the induction coil 111 to send the data signal S2 including the pressure value in the data transmission period T3 to the electromagnetic coordinate positioning apparatus 2. After the electromagnetic coordinate positioning apparatus 2 receives the pressure value, the electromagnetic coordinate positioning apparatus 2 may display, according to the pressure value, trajectory lines of different widths or in different color shades at corresponding coordinate points in the working area 29.

In an embodiment, as shown in FIG. 4, the resonance circuit 11 further includes rectifiers 115 and 117 and a stabilizer 116. The rectifiers 115 and 117 and the stabilizer 116 are electrically-coupled between a power terminal VCC and a ground terminal GND. The stabilizer 116 may be implemented by a Zener diode or a voltage regulator, and is illustrated as a Zener diode in the figure.

In an embodiment, The pointer device 1 includes a tip T and a tail E, the pressure sensing circuit 19 includes a pressure sensing circuit 19T and a pressure sensing circuit 19E, the induction coil 111 and the pressure sensing circuit 19T are disposed at the tip T, and the pressure sensing circuit 19E is disposed at the tail E. The pressure sensing circuit 19T senses a pressure applied by the tip T to the electromagnetic coordinate positioning apparatus 2 and generates an analog pressure signal of the tip T. After the analog-digital conversion circuit 10 converts the analog pressure signal of the tip T, the induction coil 111 sends a pressure value of the tip T and tip action information indicating the action of the tip T to the electromagnetic coordinate positioning apparatus 2, that is, the data signal S2 includes the pressure value of the tip T and the tip action information. Upon receiving the pressure value of the tip T and the tip action information, the electromagnetic coordinate positioning apparatus 2 displays trajectory lines of different widths or in different color shades of the tip T in the working area 29.

Furthermore, the resonance circuit 11 includes a resonance circuit 11T and a resonance circuit 11E. The pointer device 1 may further include an induction coil 112. The resonance circuit 11T and the resonance circuit 11E are respectively disposed at the tip T and the tail E. The induction coil 111 is disposed at resonance circuit 11T, and the induction coil 112 are disposed at the resonance circuit 11E at the tail E. Structurally, the actuation structure of the pressure sensing circuit 19E may traverse or be arranged in the resonance circuit 11E. The pressure sensing circuit 19E may also be a variable capacitor, a variable resistor or a variable inductor. The pressure sensing circuit 19E may sense a pressure applied by the tail E to the electromagnetic coordinate positioning apparatus 2 and generate another analog pressure signal. The pressure sensing circuit 19E transmits the analog pressure signal of the tail E to the filtering and amplifying circuit 18 and then to the analog-to-digital conversion circuit 10. The analog-to-digital conversion circuit 10 performs analog-to-digital conversion to convert the analog pressure signal of the tail E into another pressure value. When the control circuit 13 parses that the instruction signal S1 is the pressure data report instruction and the user applies a pressure to the electromagnetic coordinate positioning apparatus 2 with the tail E, the control circuit 13 triggers the induction coil 112 to send the pressure value of the tail E and tail action information indicating the action of the tail E to the electromagnetic coordinate positioning apparatus 2, that is, the data signal S2 includes the pressure value of the tail E and the tail action information. After receiving the pressure value of the tail E and the tail action information, the electromagnetic coordinate positioning apparatus 2 may generate an eraser function supporting different sizes or a airbrush function as defined by the user, at corresponding coordinate points in the working area 29 according to the pressure value of the tail E.

Further, as shown in FIG. 1 and FIG. 2, the pointer device 1 further includes a body B connected between the tip T and the tail E, and the pointer device 1 includes a pressure sensing circuit 19S and a side key 17. The side key 17 is provided at the body B. The pressure sensing circuit 19S is coupled to the power circuit 14, the filtering and amplifying circuit 18 and the side key 17. According to the force of the user holding the pointer device 1, for example, as the user applies a pressure to the side key 17 while holding and the side key 17 receives the pressure, the side key 17 may actuate the pressure sensing circuit 19S to generate an analog pressure signal corresponding to the side key 17 according to the user's force. Based on this, the predefined instructions further include another pressure data report instruction corresponding to the side key 17. When the control circuit 13 parses that the instruction signal is the another pressure data report instruction, the control circuit 13 may control the analog-to-digital conversion circuit 10 to generate key and pressure values corresponding to the side key 17 so that the data signal S2 includes the key and pressure values corresponding to the side key 17. The control circuit 13 triggers the induction coil 111 or the induction coil 112 to send the key and pressure values corresponding to the side key 17. In other words, in addition to sending the pressure values applied by the tip T and the tail E to the electromagnetic coordinate positioning apparatus 2, the pointer device 1 can further send the key and pressure values corresponding to the side key 17 to the electromagnetic coordinate positioning apparatus 2. After the electromagnetic coordinate positioning apparatus 2 receives the key and pressure values corresponding to the side key 17, the electromagnetic coordinate positioning apparatus 2 may be customized for applications such as emotional disorders or early treatment of young children to detect the user's emotional changes, according to the force of the user holding the pointer device 1.

In an embodiment, assuming that the data signal S2 has 18 bits, when the data signal S2 is manufacturing date, the data signal S2 may include 5-bit year data, 4-bit month data, 5-bit day data, and 4-bit time data; when the data signal S2 includes identification number and color data, the identification number may be 16 bits, and the color data may be 2 bits; when the data signal S2 includes a pressure value, the data signal S2 may include a 14-bit pressure value, 2-bit tip or tail information, and 2-bit key data indicating which key of the pointer device 1 the user presses.

In an embodiment, as shown in FIG. 5 to FIG. 7, to ensure that the pointer device 1 has completed the power storage process, there is a delay period TD1 between the power storage period T1 and the instruction receiving period T2.

Furthermore, as shown in FIG. 5 to FIG. 7, in the instruction receiving period T2, the induction coil 111 receives the instruction signal S1 in a receiving period T21, and after the receiving period T21, the instruction receiving period T2 further includes a delay period T22 to ensure that the data signal S2 has been stored in a register circuit 15, thus completing a preparation process for the transmission of the data signal S2. For example, when the instruction signal S1 is not the pressure data instruction, as shown in FIG. 5 and FIG. 6, the delay period T22 is between the receiving period T21 and the data transmission period T3. Further, as shown in FIG. 7, when the instruction signal S1 is the pressure data instruction, a delay period TD2 is included after the analog-to-digital conversion period T4 to ensure that the pressure value outputted by the analog-to-digital conversion circuit 10 is stored as the data signal S2 in the register circuit 15, thus completing a preparation process for the transmission of the data signal S2.

Figure 8:
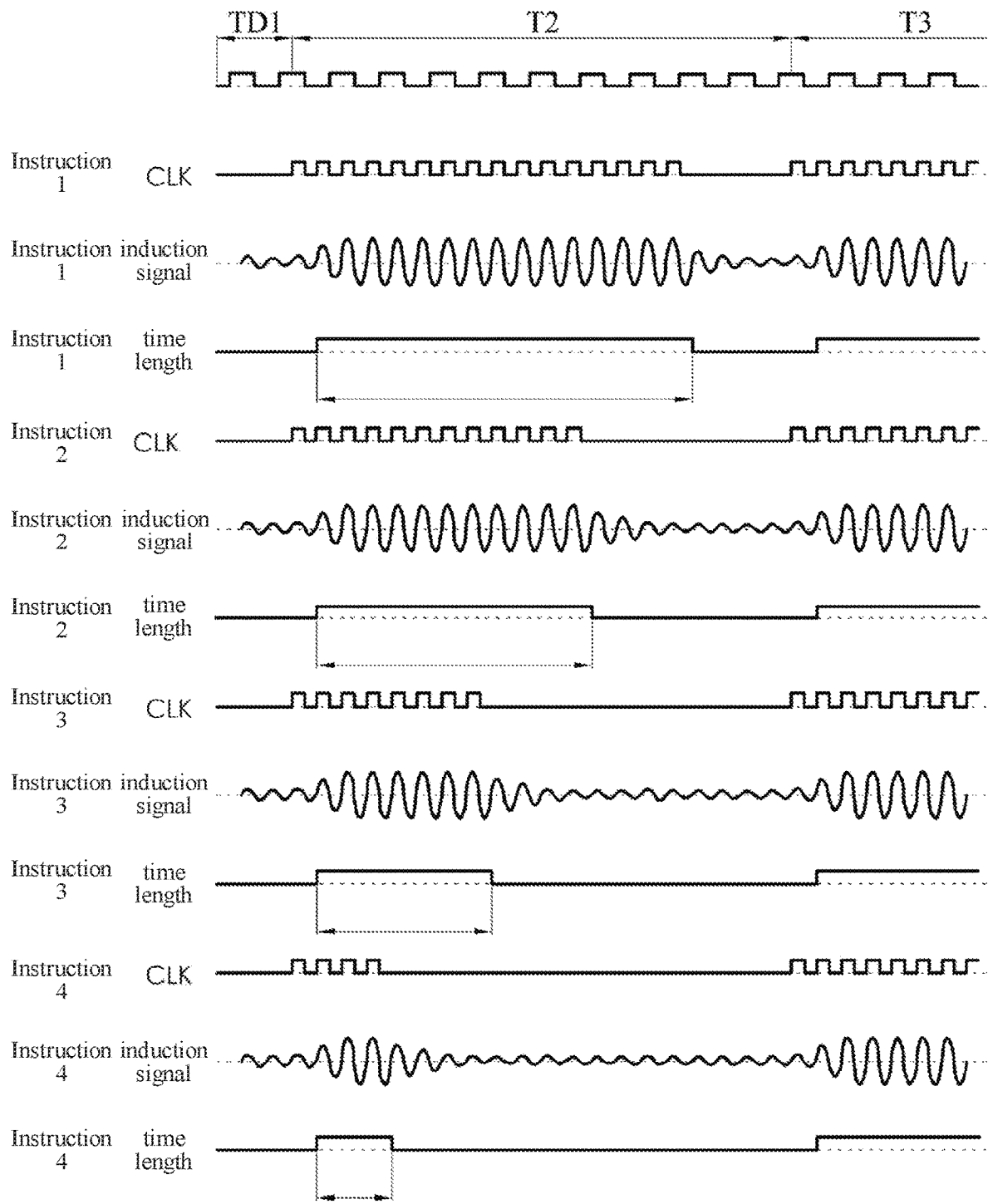
FIG. 8 is a schematic diagram illustrating that a pointer device receives different instruction signals in an instruction receiving period.

Further, as shown in FIG. 8, FIG. 8 shows different durations of continuous excitation signals included in four instruction signals S1. In the instruction receiving period T2, the induction coil 111 may generate induction signals of different time lengths according to the different durations of the continuous excitation signals, thereby implementing bidirectional communication between the pointer device 1 and the electromagnetic coordinate positioning apparatus 2.

In an embodiment, the pointer device 1 further includes a register circuit 15 electrically-coupled to the resonance circuit 11, the clock generating circuit 12, the control circuit 13, the power circuit 14 and the memory circuit 16. The register circuit 15 may store the instruction signal S1 and the data signal S2, for example, the foregoing manufacturing date, identification number, color data, pressure values of the tip T and the tail E, tip action information, tail action information and key data. The control circuit 13 may control the data signal S2 to be stored in the register circuit 15. In an embodiment, the pressure sensing circuit 19 may change the resistance, capacitance or inductance so that the change of the analog pressure signal can be detected and properly analyzed the different pressure levels.

It should be noted that although the power storage period T1, the instruction receiving period T2, the data transmission period T3 and the analog-to-digital conversion period T4 have a fixed time length, designers may design by themselves the time lengths of the power storage period T1, the instruction receiving period T2, the data transmission period T3 and the analog-to-digital conversion period T4 according to different products, processes or applications of different pointer devices 1.

Based on the above, according to an embodiment of the pointer device, the pressure signal is transmitted to the electromagnetic coordinate positioning apparatus in the form of a digital signal. Compared with an analog pressure signal, the digital pressure signal is more stable because it is directly analyzed in the pointer device, avoiding the problem that an error may occur when the analog pressure signal sent to the electromagnetic coordinate positioning apparatus is affected. In addition, a high-order analysis capability is achieved. In other words, compared with the method of changing the capacitance or the inductance to change the phase or frequency to represent the pressure levels, the digital pressure signal achieves higher stability. In addition, because the analog-to-digital conversion circuit can quickly generate a high-order pressure value, the speed of bidirectional communication between the pointer device and the analog-to-digital conversion circuit can be increased, thereby improving the report rate.

Furthermore, the power storage period, the instruction receiving period, the data transmission period, and the analog-to-digital conversion period are all fixed, and the lengths of the instruction signal and the data signal are also fixed. The process of decoding the instruction signal is simple. The circuit elements of the pointer device can operate synchronously with the electromagnetic coordinate positioning apparatus according to the clock signal. The circuit elements of the pointer device may be implemented by an application-specific integrated circuit of a digital logic circuit. The pointer device can operate at a low operating frequency and has a simple circuit architecture requiring low power consumption.

Although the disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A pointer device, adapted for an electromagnetic coordinate positioning apparatus, the pointer device comprising:
   an induction coil, configured to couple to an excitation magnetic field formed by the electromagnetic coordinate positioning apparatus to generate a power supply in a power storage period, and receive an instruction signal from the electromagnetic coordinate positioning apparatus in an instruction receiving period, the instruction signal comprising a fixed quantity of bits;
   a clock generating circuit, electrically-coupled to the induction coil and configured to generate a clock signal according to operation of the power supply; and
   a control circuit, electrically-coupled to the induction coil and the clock generating circuit, and configured to: decode the instruction signal in the instruction receiving period according to the clock signal after the power storage period to parse whether the instruction signal is one of a plurality of predefined instructions, wherein when the instruction signal is one of the plurality of predefined instructions, the control circuit triggers, in a data transmission period, the induction coil to send a data signal corresponding to the instruction signal to the electromagnetic coordinate positioning apparatus according to the clock signal after the instruction receiving period, the data signal comprising a fixed quantity of bits, and the induction coil respectively sends the bits of the data signal at different time slots in the data transmission period, to respond to the instruction signal,
   wherein the power storage period, the instruction receiving period, and the data transmission period each have a fixed time length.

2. The pointer device according to claim 1, wherein before the control circuit decodes the instruction signal, the control circuit receives a trigger signal from the electromagnetic coordinate positioning apparatus through the instruction signal, so as to decode the instruction signal in the instruction receiving period according to the trigger signal.

3. The pointer device according to claim 1, wherein instruction signal comprises continuous, uninterrupted excitation signals of the same frequency, and a duration of the continuous signals comprised in the instruction signal varies with the plurality of predefined instructions which are different.

4. The pointer device according to claim 3, wherein the plurality of predefined instructions comprise a pressure data instruction, an manufacturing date instruction and an identification number instruction, and when decoding the instruction signal, the control circuit parses according to the duration of the continuous signals comprised in the instruction signal whether the instruction signal is the pressure data instruction, the manufacturing date instruction or the identification number instruction.

5. The pointer device according to claim 4, further comprising: a memory circuit, electrically-coupled to the control circuit, wherein when the control circuit parses that the instruction signal is the manufacturing date instruction, the control circuit controls the memory circuit to output manufacturing date so that the data signal comprises the manufacturing date, so as to send the manufacturing date to the electromagnetic coordinate positioning apparatus.

6. The pointer device according to claim 5, wherein when the control circuit parses that the instruction signal is the identification number instruction, the control circuit controls the memory circuit to output identification number so that the data signal comprises the identification number, so as to send the identification number to the electromagnetic coordinate positioning apparatus.

7. The pointer device according to claim 4, further comprising:
a pressure sensing circuit, electrically-coupled to the induction coil, and configured to generate an analog pressure signal according to a pressure applied by the pointer device on the electromagnetic coordinate positioning apparatus; and
an analog-to-digital conversion circuit, electrically-coupled to the pressure sensing circuit, and configured to perform analog-to-digital conversion to convert the analog pressure signal into a pressure value,
when the control circuit parses that the instruction signal is the pressure data instruction, the data signal comprises the pressure value, so as to send the pressure value to the electromagnetic coordinate positioning apparatus.

8. The pointer device according to claim 7, wherein the analog-to-digital conversion circuit converts the analog pressure signal into a pressure value only when the instruction signal is the pressure data instruction; and the analog-to-digital conversion circuit does not convert the analog pressure signal into the pressure value when the instruction signal is the identification number instruction or the manufacturing date instruction.

9. The pointer device according to claim 7, further comprising:
a tip, configured to accommodate the induction coil;
a tail;
a body, connected between the tip and the tail;
a side key, located on the body; and
another pressure sensing circuit, configured to generate another analog pressure signal which is corresponding to the side key according to a pressure received by the side key,
wherein the plurality of predefined instructions further comprise another pressure data instruction which is corresponding to the side key, and when the control circuit parses that the instruction signal is the another pressure data instruction, the data signal comprises another pressure value which is corresponding to the side key, so as to trigger the induction coil or another induction coil of the pointer device to send the pressure value corresponding to the side key to the electromagnetic coordinate positioning apparatus.

10. The pointer device according to claim 7, further comprising:
a tip, configured to accommodate the induction coil;
a tail;
another induction coil, accommodated in the tail; and
another pressure sensing circuit, configured to generate another analog pressure signal according to a pressure applied by the tail on the electromagnetic coordinate positioning apparatus,
when the control circuit parses that the instruction signal is the pressure data instruction and the tail applies a pressure on the electromagnetic coordinate positioning apparatus, the analog-to-digital conversion circuit converts the another analog pressure signal into another pressure value so that the data signal comprises the another pressure value, so as to trigger the another induction coil to send the another pressure value and tail actuation information of the tail to the electromagnetic coordinate positioning apparatus.

* * * * *